3,389,180
17β-CYCLOALKENYLOXY-B-NORSTEROIDS
James F. Kerwin, Broomall, Pa., assignor to Smith Kline
 & French Laboratories, Philadelphia, Pa., a corporation
 of Pennsylvania
No Drawing. Continuation-in-part of application Ser.
 No. 436,671, Mar. 2, 1965. This application Nov. 14,
 1966, Ser. No. 593,701
9 Claims. (Cl. 260—586)

ABSTRACT OF THE DISCLOSURE 1-alkoxycyclopentyl and cyclohexyl ethers of B-nortestosterones, their 4 and 6-halo derivatives, and $\Delta^1$ and $\Delta^6$ derivatives, are prepared by reaction of the 17-alcohols with cyclopentanone or cyclohexanone ketals. These intermediates are then converted to the corresponding cycloalkenyl ethers of the B-nortestosterones, which have oral antiandrogenic activity.

This application is a continuation-in-part of copending Ser. No. 436,671, filed Mar. 2, 1965, now abandoned.

This invention relates to B-norsteroids. The invention is particularly concerned with B-norsteroids having a cycloalkenyloxy group at the 17β-position thereof. The compounds are active orally as antiandrogenic agents.

The compounds of the invention are represented by the following structural formula:

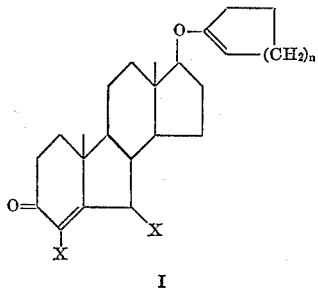

I wherein:

X is hydrogen, chloro, or bromo; and
n is 1 or 2.

Also included among the compounds of the invention are the $\Delta^1$ and $\Delta^6$ analogs of compounds of Formula I.

The compounds of the invention are prepared by heating a 17β-hydroxy-B-norsteroid with a diethyl or dimethyl ketal of cyclopentanone or cyclohexanone at a temperature of about 130–180° C. for a period of thirty minutes to three hours. The volatile material is allowed to distill slowly, thus carrying the reaction to completion. Alternatively, a moderately high boiling solvent such as benzene may be used in conjunction with an acid catalyst. In a further alternative, the 17β-hydroxy-B-norsteroid may be refluxed with the ketal in a low boiling solvent such as chloroform in the presence of an acid catalyst such as p-toluenesulfonic acid. The resulting intermediate possesses structure II.

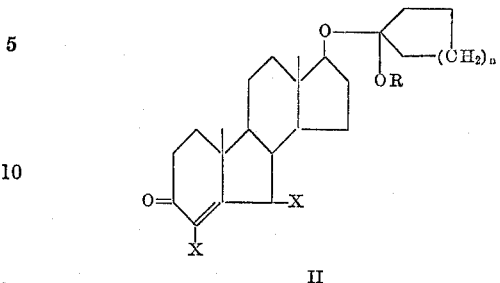

II where R is methyl or ethyl.

The intermediate II is then melted at 190–200° C. in the presence of a small amount of an organic base such as quinoline or pyridine to form the cycloalkenyloxy derivative of Formula I. Compounds of Formula II, which are thus useful as intermediates for the preparation of compounds of Formula I, are considered part of the present invention.

The 17β-hydroxy starting materials are available as follows. B-nortestosterone is described by Joska, Fajkos and Sorm, Chemistry & Industry, 1958, 1965. The 4-chloro and 4-bromo-B-nortestosterone starting materials are described in the Kerwin copending application, Ser. No. 393,365, filed Aug. 31, 1964. The $\Delta^1$ starting material is prepared by hydrolyzing $\Delta^1$-B-nortestosterone acetate, described by Bozzato et al., J. Am. Chem. Soc., 86, 2073 (1964). The $\Delta^{6(8)}$ and 6-halo starting materials are prepared by subjecting B-nortestosterone 3-enol ether to the action of N-halosuccinimides. The resulting 6-halo compound is then converted to the $\Delta^6$ analog by treatment with lithium chloride and lithium carbonate in dimethylformamide.

The cycloalkenyloxy-B-norsteroids of the present invention are preferably administered orally to an appropriate subject in the form of tablets or capsules containing effective, but nontoxic amounts of steroid mixed with a solid carrier. The carrier contains one or more standard ingredients such as starch, sugar, gums, etc. They are also administered in an oil solution such as sesame oil. They may also be administered by subcutaneous or intramuscular injection, dissolved or suspended in a suitable nontoxic liquid vehicle. They may be administered in the form of suppositories, dissolved or suspended in a fatty or waxy vehicle which melts approximately at body temperature, or topically in the form of an ointment or cream in which they are dissolved or suspended in an appropriate base. They are orally active at a dosage level of 100–200 mg./kg. in rats.

The present compounds, although possessing increased oral antiandrogenic activity compared with the unetherified 17-alcohols, possess greatly diminished central nervous system depressant activity relative to the alcohols. Since etherifying 17-alcohols with a cycloalkenyl group would be expected to result in compounds with increased activity by the oral route, the separation of activities in the present etherified compounds is unexpected and advantageous.

The following examples illustrates the practice of the invention, but are not to be construed as limiting the scope thereof.

PREPARATION OF PRODUCTS

Example 1.—17β-(1-cyclopentenyloxy)-B-norandrost-4-en-3-one

A mixture of 5 grams of B-nortestosterone and 10 ml. of cyclopentanone diethyl ketal is heated at 140–145° for 45 minutes. The temperature is then raised to 160–170° and volatile material allowed to distill slowly over a period of about 2 hours. Approximately 6 ml. of distillate is collected. The reaction mixture is cooled, diluted with aqueous methanol containing several drops of pyridine, and cooled further. The solid is collected and recrystallized from methanol containing a small amount of pyridine to obtain the title product, M.P. 114–116°.

Example 2

The following compounds are treated with the diethyl ketal of cyclopentanone according to the procedure of Example 1.

4-chloro-B-nortestosterone
4-bromo-B-nortestosterone
6-chloro-B-nortestosterone
Δ¹-B-nortestosterone
Δ⁶-B-nortestosterone The products obtained are, respectively, the following:

4-chloro-17β-(1-cyclopentenyloxy)-B-norandrost-4-en-3-one
4-bromo-17β-(1-cyclopentenyloxy)-B-norandrost-4-en-3-one
6-chloro-17β-(1-cyclopentenyloxy)-B-norandrost-4-en-3-one
17β-(1-cyclopentenyloxy)-B-norandrosta-1,4-dien-3-one
17β-(1-cyclopentenyloxy)-B-norandrosta-4,6-dien-3-one

Example 3

A mixture of 5 grams of B-nortestosterone and 10 ml. of cyclohexanone diethyl ketal is heated at 140–145° for 45 minutes. The temperature is then raised to 160–170° and volatile material allowed to distill slowly over a period of about 2 hours. Approximately 6 ml. of distillate is collected. The reaction mixture is cooled, diluted with aqueous methanol containing several drops of pyridine, and cooled further. The solid is collected and recrystallized from methanol containing a small amount of pyridine to obtain 17β-(1-cyclohexenyloxy)-B-norandrost-4-en-3-one.

Example 4

The following compounds are treated with the diethyl ketal of cyclohexanone according to the procedure of Example 3.

4-chloro-B-nortestosterone
4-bromo-B-nortestosterone
6-chloro-B-nortestosterone
Δ¹-B-nortestosterone
Δ⁶-B-nortestosterone The products obtained are, respectively, the following:

4-chloro-17β-(1-cyclohexenyloxy)-B-norandrost-4-en-3-one
4-bromo-17β-(1-cyclohexenyloxy)-B-norandrost-4-en-3-one
6-chloro-17β-(1-cyclohexenyloxy)-B-norandrost-4-en-3-one
17β-(1-cyclohexenyloxy)-B-norandrosta-1,4-dien-3-one
17β-(1-cyclohexenyloxy)-B-norandrosta-4,6-dien-3-one

Example 5.—17β-(1-ethoxycyclopentyloxy)-B-norandrost-4-en-3-one

To 3 grams of B-nortestosterone dissolved in 100 ml. of chloroform are added 5 mg. of p-toluenesulfonic acid and 5 ml. of cyclopentanone diethyl ketal. The reaction mixture is distilled for about 30 minutes, the residue is neutralized with ethanolic potassium hydroxide, and distillation is completed under reduced pressure. The residue is recrystallized from methanol.

Example 6.—17β-(1-cyclopentenyloxy)-B-norandrost-4-en-3-one

One gram of 17β - (1 - ethoxycyclopentyloxy)-B-norandrost-4-en-3-one is heated in an oil bath at 190–200° C. for 70 minutes in the presence of a drop of quinoline. The residue is taken up in methanol, filtered, and crystallized from methanol to produce the title product.

Example 7

When the following starting materials are treated with cyclopentanone diethyl ketal according to the procedure of Example 5, the intermediates listed below are obtained. When these intermediates are heated as in Example 6, the listed products are obtained.

Starting material: 4-bromo-B-nortestosterone
Intermediate: 4-bromo-17β-(1-ethoxycyclopentyloxy)-B-norandrost-4-en-3-one
Product: 4-bromo-17β-(1-cyclopentenyloxy)-B-norandrost-4-en-3-one Starting material: 6-chloro-B-nortestosterone
Intermediate: 6-chloro-17β-(1-ethoxycyclopentyloxy)-B-norandrost-4-en-3-one
Product: 6 chloro-17β-(1-cyclopentenyloxy)-B-norandrost-4-en-3-one Starting material: Δ⁶-B-nortestosterone
Intermediate: 17β-(1-ethoxycyclopentyloxy)-B-norandrosta-4,6-dien-3-one
Product: 17β-(1-cyclopentenyloxy)-B-norandrosta-4,6-dien-3-one

Example 8

When the following starting materials are treated with cyclohexanone dimethyl ketal according to the procedure of Example 5, the intermediates listed below are obtained. When these intermediates are heated as in Example 6, the listed products are obtained.

Starting material: 4-chloro-B-nortestosterone
Intermediate: 4-chloro-17β-(1-methoxycyclohexyloxy)-B-norandrost-4-en-3-one
Product: 4-chloro-17β-(1-cyclohexenyloxy)-B-norandrost-4-en-3-one Starting material: Δ¹-B-nortestosterone
Intermediate: 17β-(1-methoxycyclohexyloxy)-B-norandrosta-1,4-dien-3-one
Product: 17β-(1-cyclohexenyloxy)-B-norandrosta-1,4-dien-3-one

PREPARATION OF STARTING MATERIALS

Example 9.—Δ¹-B-nortestosterone

A solution of 2 g. of 17β-acetoxy-B-norandrosta-1,4-dien-3-one in 60 ml. of methanol is heated to reflux and a solution of 0.35 g. of potassium hydroxide in 10 ml. of water is slowly added over a 30 minute period. After refluxing for 2 hours, the solution is cooled, poured into water, and extracted with methylene chloride. The extracts are dried and evaporated, and the residue recrystallized to give the title product.

Example 10.—6-chloro-B-nortestosterone and Δ⁶-B-nortestosterone

Fifteen grams of B-nortestosterone acetate is dissolved in 75 ml. of trimethyl orthoformate and 20 ml. of benzene with 0.2 g. of p-toluenesulfonic acid. The solution is distilled very slowly until the distillation temperature reaches 97° and about half the solution is distilled (about 6 hours). Pyridine is added to the cooled solution to neutralize the acid and the solution is then poured into dilute sodium carbonate solution. Extraction with chloroform containing pyridine followed by evaporation of the solvent leaves an oil which is dissolved in petroleum ether. On cooling, some starting material crystallizes. This is filtered and the filtrate is applied to an alumina column. Elution with petroleum ether gives 17β-acetoxy-3-methoxy-B-norandrosta-3,5-diene which is recrystallized from aqueous methanol containing a little pyridine.

Two grams of this 17-acetate in 50 ml. of methanol containing 10 ml. of 10% sodium hydroxide is refluxed under nitrogen for 3 hours. The cooled mixture is poured into water containing a little pyridine and extracted with chloroform. Evaporation gives the 17-alcohol, which is recrystallized from acetone-hexane.

A mixture of 1.6 g. of 3-methoxy-B-norandrosta-3,5-dien-17β-ol, 50 ml. of acetone, 1.2 g. of sodium acetate in 15 ml. of water and 1.0 g. of N-chlorosuccinimide is stirred at 0°. Two ml. of acetic acid are added dropwise with stirring over 30 minutes. After another hour, the reaction mixture is diluted with water, poured into dilute sodium bisulfite solution and extracted with chloroform. Evaporation gives 6α - chloro - B-nortestosterone which is recrystallized from acetone-hexane.

By the same method as above, but substituting an equimolar amount of N-bromosuccinimide for N-chlorosuccinimide, the 6α-bromo compound is prepared.

A solution of 3 g. of 6α-bromo-B-nortestosterone and 1.0 g. of lithium chloride in 50 ml. of dimethylsulfoxide is allowed to stand at room temperature for 3 hours. The solution is poured into water and extracted with benzene. Evaporation of the dried extract gives 6β-chloro-B-nortestosterone which is recrystallized from ether-hexane.

A mixture of 0.1 g. of 6β-chloro-B-nortestosterone, 0.2 g. of lithium chloride, 0.2 g. of lithium carbonate and 10 ml. of dimethylformamide is heated at reflux for six hours. The cooled reaction mixture is poured into water and extracted with benzene. Drying and evaporation of the combined organic extracts leaves a residue which is purified by crystallization from ether to give Δ⁶-B-nortestosterone.

I claim:
1. A compound of one of the following formulas

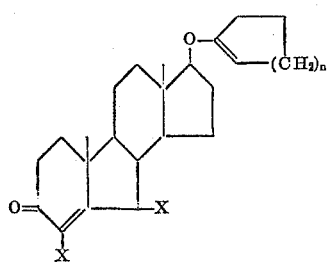

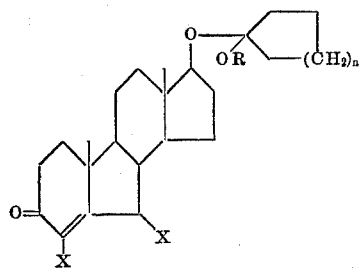

or a Δ¹ or Δ⁶ analog thereof, wherein:
X is hydrogen, chloro, or bromo;
n is an integer from 1 to 2; and
R is methyl or ethyl.

2. A compound as claimed in claim 1, having the formula

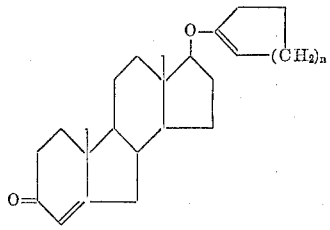

where $n$ is an integer from 1 to 2.

3. A compound as claimed in claim 1, having the formula

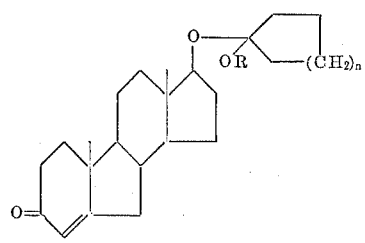

where $n$ is an integer from 1 to 2 and R is methyl or ethyl.

4. A compound as claimed in claim 2, where $n$ is 1, being the compound 17β-(1-cyclopentenyloxy)-B-norandrost-4-en-3-one.

5. A compound as claimed in claim 2, where $n$ is 2, being the compound 17β(1 - cyclohexenyloxy) - B-norandrost-4-en-3-one.

6. A compound as claimed in claim 3, where $n$ is 1 and R is ethyl, being the compound 17β-(1-ethoxycyclopentyloxy)-B-norandrost-4-en-3-one.

7. A compound as claimed in claim 1, being the compound 17β-(1-cyclopentenyloxy)-B-norandrosta-1,4-dien-3-one.

8. A compound as claimed in claim 1, being the compound 17β-(1-cyclopentenyloxy)-B-norandrosta-4,6-dien-3-one.

9. A compound as claimed in claim 1, being the compound 4 - chloro-17β-(1-cyclopentenyloxy)-B-norandrost-4-en-3-one.

References Cited

Rull et al.: Bull. Chem. Soc., France, p. 158 (1958).
Ercoli: Chem. Abst., vol. 57, col. 12569a (1962).

BERNARD HELFIN, *Acting Primary Examiner.*

M. JACOBS, *Assistant Examiner.*